United States Patent [19]

Schetter et al.

[11] Patent Number: 5,140,866
[45] Date of Patent: Aug. 25, 1992

[54] GEARSHIFT DEVICE FOR A MULTIPLE-GEAR GEAR CHANGE BOX IN A MOTOR

[75] Inventors: Martin Schetter, Besigheim; Fritz Bühlmaier, Schwäbisch Gmünd, both of Fed. Rep. of Germany

[73] Assignee: Zahnradfabrik Friedrichshafen AG, Fed. Rep. of Germany

[21] Appl. No.: 778,201

[22] PCT Filed: Jun. 25, 1990

[86] PCT No.: PCT/EP90/01005
§ 371 Date: Dec. 10, 1991
§ 102(e) Date: Dec. 10, 1991

[87] PCT Pub. No.: WO91/00448
PCT Pub. Date: Jan. 10, 1991

[30] Foreign Application Priority Data

Jun. 29, 1989 [DE] Fed. Rep. of Germany ....... 3921359
Apr. 2, 1990 [DE] Fed. Rep. of Germany ....... 4010549

[51] Int. Cl.⁵ .................................... B60K 20/00
[52] U.S. Cl. .................................. 74/473 R; 74/475; 384/49; 403/109
[58] Field of Search ............. 74/473 R, 475; 384/49, 384/55; 403/109, 355

[56] References Cited

U.S. PATENT DOCUMENTS 4,544,212 10/1985 Parzefall et al. ............. 74/473 R X
4,705,491 11/1987 Andersson ..................... 384/49 X

FOREIGN PATENT DOCUMENTS 0144554 6/1985 European Pat. Off. .
2801182 6/1979 Fed. Rep. of Germany .
2037916 7/1980 United Kingdom .

*Primary Examiner*—Dirk Wright
*Attorney, Agent, or Firm*—Davis, Bujold & Streck

[57] ABSTRACT

In a gearshift device of a multiple-gear transmission of a motor vehicle in which gear shift gates are selected by the rotation of a central selector shaft (2) and gear steps are engaged by the subsequent axial movement thereof. The selector shaft (2) is non-rotatably and axially movable via roller bodies in a hub (4) of a lever-type selector rocker (3). Several rows of balls (12) extending axially, which with a part of their surface positively engage in guide grooves (10 and 11) both of the hub (4) and of the selector shaft (2), are arranged in a cage (13) situated between hub (4) and selector shaft (2) to prevent backlash between the hub (4) and the selector shaft (2) in a peripheral direction in a radial direction.

10 Claims, 2 Drawing Sheets

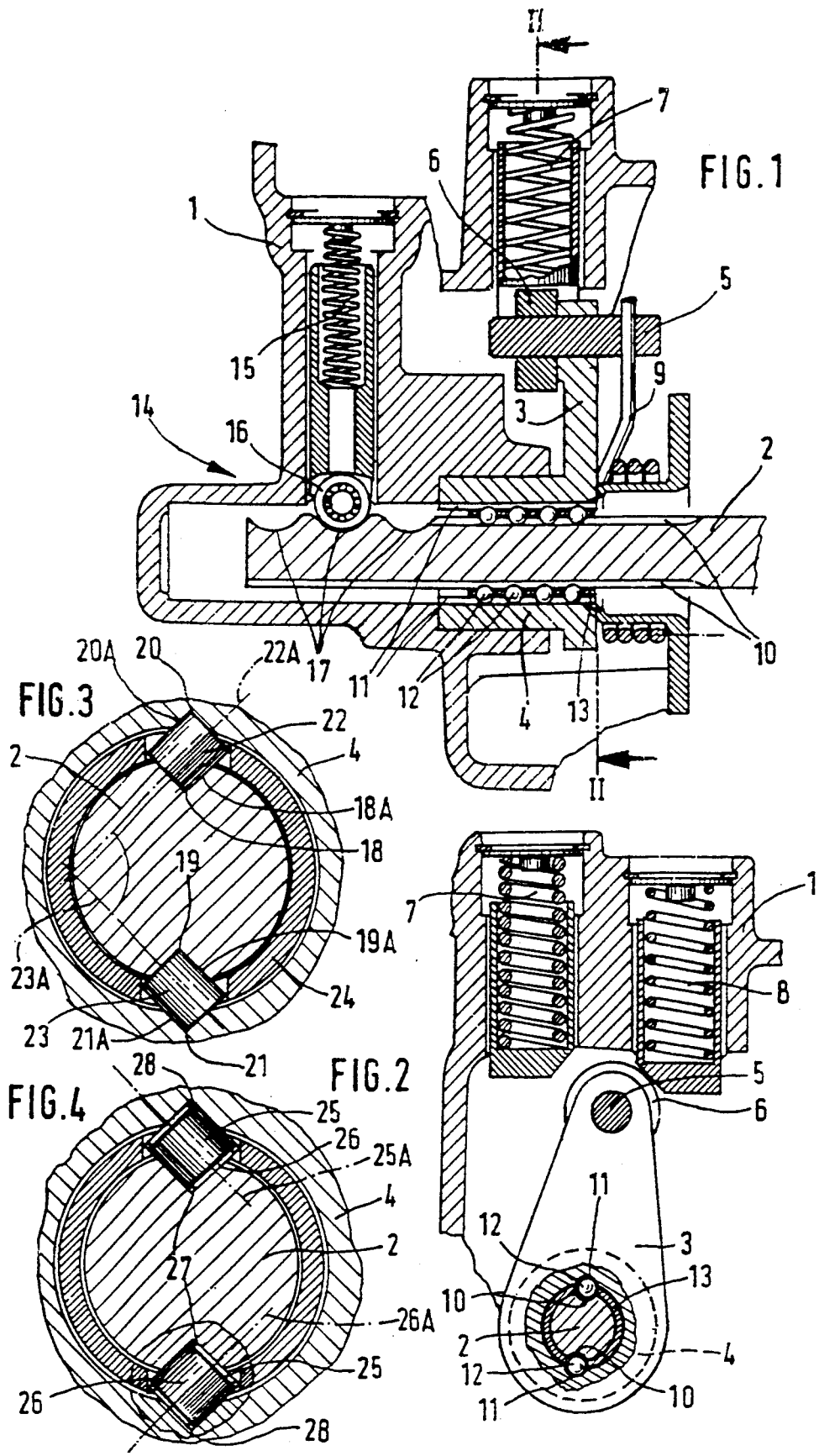

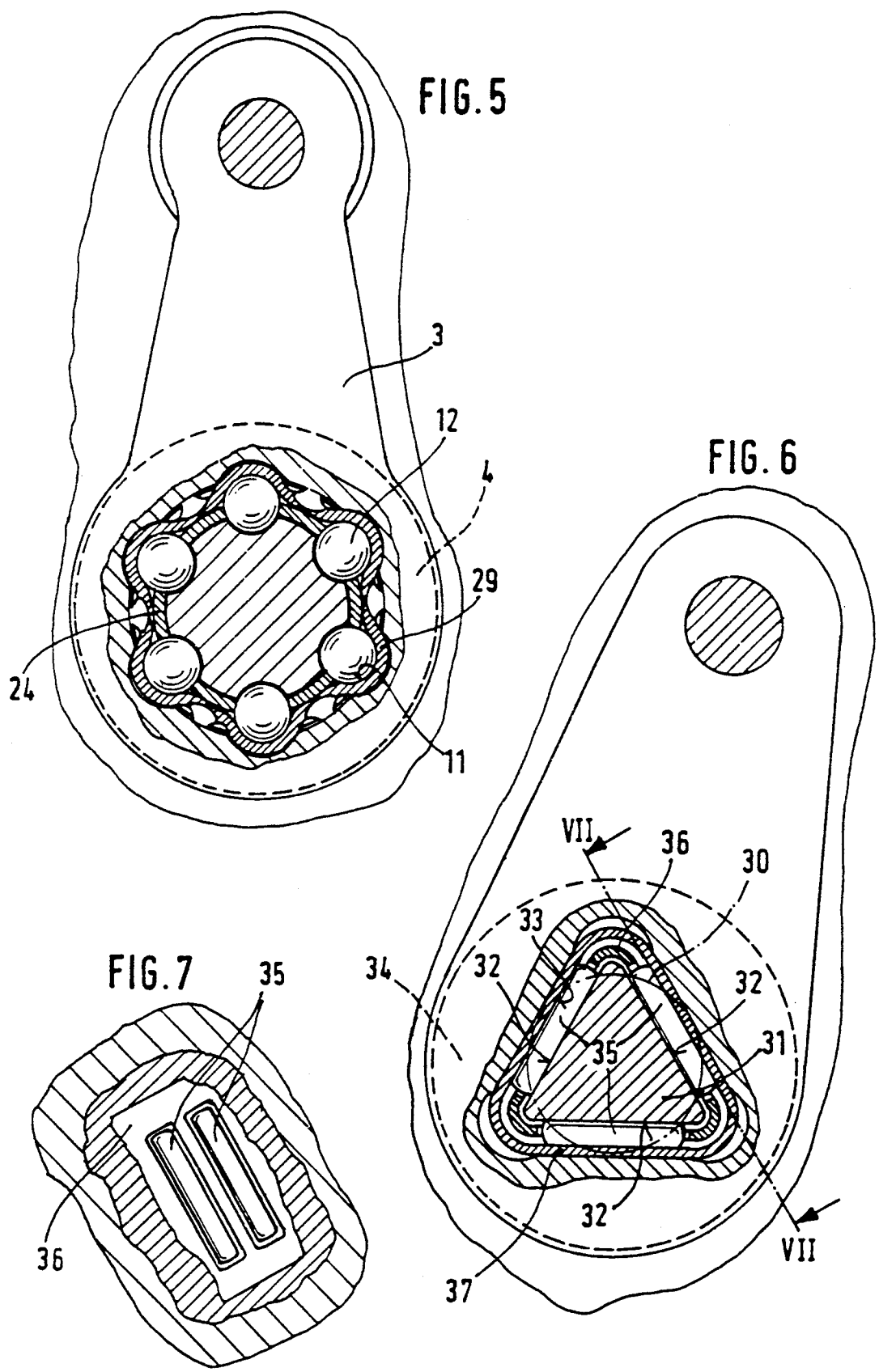

GEARSHIFT DEVICE FOR A MULTIPLE-GEAR GEAR CHANGE BOX IN A MOTOR

According to the preamble of claim 1, the invention concerns a gearshift device for a multiple-gear transmission of a motor vehicle including a central selector shaft, rotatable and axially movable in the transmission housing, by whose rotation can be selected a gearshift clutch to be actuated in a gearshift gate and by whose subsequent axial movement gear steps can be engaged, having a selector rocker designed as lever in whose hub the selector shaft is non-rotatably and axially movably passed over roller bodies that engage in axially extending guide grooves of the hub, and can be shifted from its neutral position to a selected end position against the tension of at least one spring element secured to the housing.

In the publication "Muncie, HM-290, Manual Transmission", pages 1-40 and 1-42, a gearshift device of the above kind has been disclosed wherein drag rollers, which engage in longitudinal grooves of the selector rocker, are situated on the selector shaft over radial pins. If a shift gate is selectee by means of a gearshift lever, rotation of the selector shaft, in which the drag rollers move the selector rocker from its central neutral position against the spring elements secured to the housing, results. In the subsequent shift movement, the selector shaft is axially moved so that the drag rollers roll away in the guide grooves of the hub. The drag rollers must have radial backlash within the guide grooves in order that when rolling out on one of the two pathways of the respective guide groove, they can move freely with respect of the other pathway. Without said radial backlash, the drag rollers would cramp in the guide grooves. Due to said radial backlash, an idle path which disadvantageously allows vibrations in the gearshift lever results in the gearshift device in the direction of selection.

The invention is based on the problem of providing a drag and longitudinal movement free of backlash and friction between selector shaft and selector rocker.

According to the characteristic part of claim 1, this problem is solved by the fact that the selector shaft has guide grooves and the roller bodies are designed as balls which, in the radial interspace between the hub and the selector shaft, are situated in a cylindrical cage arranged in several rows extending in an axial direction and are guided by part of their surface in positive engagement in the guide grooves both of the hub and of the selector shaft. Such linear direction is in position to fix absolutely, without backlash with respect to each other, the selector shaft and the selector rocker. The balls arranged in rows on the periphery of the selector shaft take care of an untilting support of the elements with respect to each other so that a small friction occurs between them. A considerable reduction of the shifting forces is thereby possible. The oscillations transmitted to the transmission of the motor vehicle, due to unevenness of rotation of the prime mover, no longer results in vibrations of the gearshift lever by virtue of the rotation between hub and selector shaft drag free of backlash.

Even though publication DE-AS 28 01 182 has disclosed a drive shaft of variable length in which an external portion of the shaft is movable with respect to an internal portion thereof in a linear direction, said device is provided for a telescopable drive shaft.

The invention stated in sub-claim 2 refers to a gearshift device for a multi-gear change gear transmission of a motor vehicle which essentially coincides with the gearshift device according to the preamble of claim 1, but in which the selector shaft in the hub is guided over cylindrical roller bodies.

The problem on which the invention is based is to be solved according to said sub-claim 2 by the fact that the selector shaft has guide grooves, that the guide grooves of the hub and selector shaft are V-shaped, the roller bodies passed into a cage rolling out on respective parallel pathways of the V-shaped guide grooves and the axes of rotation of adjacent roller bodies intersect each other forming an angle of 90°. In this kind of guidance, in which a reaction torque of the locking rocker results on the selector shaft in both tilt directions over the cylindrical roller bodies, backlash can also be prevented between the structural elements at the same time with frictionless longitudinal displacement.

In claims 3 and 4 are described advantageous embodiments of the arrangement according to claim 2. According to claim 3, the axes of rotation of the roller bodies, lying in a transverse plane of the hub, can intersect each other forming an angle of 90°. If the selector shaft and the hub are provided respectively with two guide grooves, then an adequate arrangement of both roller bodies lying in one transverse plane effects a torque reaction in both directions of rotation.

According to claim 4, alternative to the above, the roller bodies disposed in a row can produce a torque reaction in both directions of rotation. For this purpose the roller bodies, alternatively rotated by 90°, are situated in the respective guide groove so that all sidewalls of the guide groove are used as paths for rolling.

According to independent claim 5, the selector shaft is designed as a right prism at least over an axial area on which it is movably guided within the hub of the selector rocker, the hub having guide surfaces extending parallel with the side surfaces of the prism, and between the side surfaces and the guide surfaces cylindrical roller bodies passed into a cage adapted to the cross section of the prism are situated. Said prism has several side surfaces which extend evenly and in an axial direction of the selector shaft, are easy to produce and can be supported in a simple way by cylindrical roller bodies opposite to the guide surfaces of the hub. According to claim 6, the prism can advantageously have a base in the shape of an equilateral triangle. The side surfaces of the prism related to such a triangular base can be produced in a simple manner by tumble pressing, according to claim 7.

Further, according to claim 8, a hub, designed with the features of claim 1, can have a drawn plate ring compressed into the hub and guide grooves for balls. An expensive heat treatment of the selector rocker is thus eliminated since said plate ring can be casehardened. Besides, claim 9 states a process for producing a selector rocker in which the grooves in the hub are produced by a non-cutting or a cutting processing and in the subsequent compression of the plate ring, this is shaped in the grooves so as to have in its inner periphery guide grooves of higher precision. On account of its weak stability of shape resulting from its thin wall thickness, the precise contour of the plate ring is determined after the compression by the non-hardened and therefore precise hub so that the distortions due to hardening do not become negatively noticeable. The drawing process during the production of the plate ring produces a surface of great excellence in the guide grooves.

Finally, according to claim 10 a process is proposed for producing a selector shaft designed with the features stated in claim 1 according to which the guide grooves of the selector shaft are produced by cold working in the rolling process. With said process, known for producing gearings, a great precision can be attained. By the cold working, the strength of the pre-tempered material of the selector shaft increases in a manner such that a hardening process can be eliminated. The rolled guide grooves have an extremely high-quality surface which ensures very good behavior in the subsequent operations.

For further explanation of the invention reference is had to the drawings in which two simplified embodiments are shown. In the drawings:

FIG. 1 is a section of a transmission housing with a portion of a central selector shaft which in this area is movably passed into a selector rocker, FIG. 2 shows a cross section according to line II—II in FIG. 1, FIG. 3 is another embodiment in cross section in which the selector shaft is passed longitudinally movably into a selector rocker over cylindrical roller bodies, FIG. 4 is an embodiment which essentially coincides with the gearshift device of FIG. 3, but in which in an illustrated row of cylindrical roller bodies their axes of rotation intersect each other, FIG. 5 shows a side view of a selector rocker, which essentially coincides with FIGS. 1 and 2, into which a plate ring is compressed, FIG. 6 shows a side view of a selector rocker with a cross section through a selector shaft in its area designed as a triangular prism, and FIG. 7 shows a partial section through a hub of the selector rocker according to lines VII—VII.

In FIGS. 1 and 2, an end face section of a transmission housing, into which is passed a central selector shaft 2, is designated with 1. Said selector shaft 2 is turned while selecting a shift gate by means of a gearshift lever not shown, and is axially moved in the subsequent engagement of a gear step within said gear gate. The selector shaft 2 accommodates gearshift fingers, not designated in particular, which, depending on the design of the gearshift mechanism, selectively engage in gearshift rails connected with gearshift forks or selectively carry out the gearshift in shift rockers directly engaging in the shift sleeves.

In the transmission housing, a selector rocker 3, designed as an one-arm lever, is in addition rotatably mounted by means of its hub 4. Said selector rocker 3 accommodates, on its radially projecting end, a roller 6 supported on a bolt 5, which roller, as can especially be seen from FIG. 2, is movable against spring elements 7 and 8 lying in its rocking area and situated in the transmission housing 1. In addition, a leg spring 9 which serves to produce a selective force is likewise supported in the transmission housing 1 and, by one end, engages the bolt 5 that supports the rollers 6.

According to the first embodiment of the invention, as is to be understood from FIGS. 1 and 2, the selector shaft 2 has radial guide grooves 10. The hub 4 of the selector rocker 3 is likewise provided with guide grooves designated by 11 which lie in a radial plane with the guide grooves 10 of the selector shaft 2. Both the selector shaft 2 and the hub 4 respectively engaged, with part of their surfaces, balls 12 which are passed into a cylindrical cage 13 radially situated between the hub 4 and the selector shaft 2 in the guide grooves 10 and 11. Upon the already explained rotation of the selector shaft 2, the balls 12 abutting in the guide grooves 10 and 11 effect a positive engagement with the selector rocker 3, and the selector rocker 3 is consequently moved on its end designed as radial lever in a manner such that the roller 6 pushes one of the two spring elements 7 or 8 into the transmission housing 1. Upon the subsequent axial movement of the selector shaft 2, the balls 12 passed into the cage 13 roll out in the guide grooves 10 and 11. A shift detent 14 whose detent roller 16, pressurized via a spring 15, engages in recesses 17 made on the selector shaft 2 serves for locking the selector shaft 2 in its axial neutral and shift positions.

With the longitudinal guidance between the hub 4 and the selector shaft 2 shown in FIGS. 1 and 2, it is possible to carry out a torque transmission free of backlash so that it is possible to prevent vibrations in the gearshift lever resulting from an idle path in a direction of rotation of said two elements. The selector shaft 2 is, in addition, guided via a relatively large axial area with slight bearing friction whereby the shifting forces can be altogether reduced.

The other embodiment, according to FIG. 3 differs from the arrangement shown in FIGS. 1 and 2 by the fact that the selector shaft 2 and the hub 4 of the selector rocker 3 have two V-shaped guide grooves 18 or 19 and 20 or 21. The guide grooves 18 and 20, the same as 19 and 21, each jointly accommodate a row of cylindrical roller bodies 22 and 23. The roller bodies 22 roll out upon a longitudinal movement of the selector shaft 2 on a rolling pathway 18A of the guide groove 18 and on a rolling pathway 20A of the guide groove 20. In a corresponding manner, rolling pathways 19A and 21A are present in the guide grooves 19 and 21 for the roller bodies 23. Thus, in order to obtain a torque reaction between both rows of roller bodies 22 and 23, the rolling paths 18A and 19A of the selector shaft 2 and the rolling paths 20A and 21A of the hub 4 are respectively remote from each other in a peripheral direction and consequently the axes of rotation 22A and 23A of the roller bodies 22 and 23 intersect each other forming an angle of 90°. The rows of cylindrical bodies 22 and 23 are passed into a cage 24 situated between the hub 4 and the selector shaft 2.

In the embodiment of FIG. 4, cylindrical roller bodies 25 and 26 are situated in V-shaped grooves 27 and 28 of selector shaft 2 and hub 4. The roller bodies 25 assume an installation position offset by 90 ° with respect to the roller bodies 26 so that their axes of rotation 25A and 26A necessarily intersect each other forming a 90° angle. To make clear this installation position of the roller bodies 25 and 26 offset by 90°, the selector shaft 2 and the hub 4 are in FIG. 4 cut offset around a roller body. Since according to a magnitude, the diameter of the roller bodies 25 and 26 is larger than the axial structural length thereof, they do not extend on the end face on the rolling paths of the guide grooves 27 and 28.

In FIG. 5, a side view of the selector rocker 3 is shown in whose hub 4 is compressed a plate ring. Said plate ring forms guide grooves 11 in which are situated the roller bodies designed as balls 12. In the production of the selector rocker 3, bores are made first in the hub 4, that is, on the periphery of the bore thereof, by a cutting processing or a non-cutting processing such as sintering and the plate ring 29 is subsequently compressed into the hub, the plate ring 29 having corresponding guide grooves 11 as a result of the compression operation.

Another embodiment of the invention is shown in FIG. 6. An area of the selector shaft 30 is designed as triangular prism. Said prism has lateral surfaces 32, cylindrical roller bodies 35 being situated between the lateral surfaces 32 and the guide surfaces 33 of a hub 34 that extend parallel thereto. A cage 36 serves to guide said roller bodies 35 and has a contour adapted to the course of the lateral surfaces 32 and the guide surfaces 33. The cylindrical roller bodies, as to be understood from the partial section in FIG. 7 are situated across the axial direction of motion of the selector shaft 30.

The section of the selector rocker 3 designed in the shape of a lever can be produced as blanking part pressed upon the hub 4. A plate ring 32 compressed in the hub 34 in addition forms the guide surfaces 33.

Reference numerals
1: transmission housing
2: selector shaft
3: selector rocker
4: hub of 3
5: bolt
6: roller
7: spring element
8: spring element
9: leg spring
10: guide groove on 2
11: guide groove on 4
12: balls
13: cage
14: gearshift detent
15: spring
16: detent roller
17: recesses
18: V-shaped guide groove on 2
18A: rolling path
19: V-shaped guide groove on 2
19A: rolling path
20: V-shaped guide groove on 4
20A: rolling path
21: V-shaped guide groove on 4
21A: rolling path
22: row of cylindrical roller bodies
22A: axis of rotation of 22
23: row of cylindrical roller bodies
23A: axis of rotation of 23
24: cage
25: roller body
25A: axis of rotation of 25
26: roller body
27: guide groove on 2
28: guide groove on 4
29: plate ring
30: selector shaft
31: prism
32: lateral surfaces of 31
33: guide surfaces
34: hub
35: cylindrical roller bodies
36: cage
37: plate ring

We claim:

1. A gearshift device for a multiple-gear transmission motor vehicle which includes in a transmission housing (1), a rotatable and axially movable central selector shaft (2) by whose rotation can be selected a respective gearshift clutch to be actuated in a gearshift gate and by whose subsequent axial movement gear steps are engageable, a selector rocker (3) designed as lever in whose hub (4) is non-rotatably and axially movably passed, via roller bodies that engage in axially extending guide grooves of said hub (4), said selector shaft (2) which is movable from a central to a selected end position against tension of at least one spring element (7 and 8) secured to the housing, characterized in that said selector shaft (2) has guide grooves (10) and said roller bodies are designed as balls (12) which, arranged in several axially extending rows, are situated in a cylindrical cage (13) in a radial interspace between said hub (4) and said selector shaft (2) and a part of their surface is passed in positive engagement into the guide grooves (11 and 10) of both said hub (4) and said selector shaft, there being compressed into said hub (4) a plate ring (29) which has the guide grooves (11) for said balls (12).

2. A gearshift device for a multiple-gear transmission of a motor vehicle which includes in a transmission housing (1), a rotatable and axially movable selector shaft (2) by whose rotation can be selected a respective gearshift clutch to be actuated in a gearshift gate and by whose subsequent axial movement gear steps are engageable, a selector rocker (3) designed as lever in whose hub (4) is non-rotatably and axially movably passed, via cylindrical roller bodies that engage in axially extending guide grooves of said hub (4), said selector shaft (2) which is movable from a neutral to a selected end position against tension of at least one spring element (7 and 8) secured to the housing, characterized in that said selector shaft (2) has guide grooves (18 and 19, 27), said guide grooves (18, 19, 20 and 21, 27 and 28) of said hub (4) and of said selector shaft (2) are V-shaped, said roller bodies (22 and 23, 35 and 26) are passed into a cage (21) and roll out on rolling paths (18A and 20A) of said V-shaped guide grooves parallel with each other, and axes of rotation of adjacent roller bodies (22 and 23) intersect each other forming in a 90° angle.

3. A gearshift device according to claim 2, characterized in that the axes of rotation of said roller bodies (22 and 23) on a transverse plane of said hub (4) intersect each other forming a 90° angle.

4. A gearshift device according to claim 2, characterized in that the axes of rotation of said roller bodies (25 or 26) arranged in a row intersect each other respectively forming a 90° angle, said roller bodies (25 or 26) of the respective row having a diameter larger than their axial extension.

5. A gearshift device for a multiple-gear transmission of a motor vehicle which includes in a transmission housing, a central selector shaft (30) rotatable and axially movable by whose rotation can be selected a respective gearshift clutch to be actuated in a gearshift gate and by whose subsequent axial movement gear steps are engageable, a selector rocker designed as lever in whose hub (34) is non-rotatably passed via roller bodies said selector shaft (30) which is movable from a neutral to a selected end position against tension of at least one spring element secured to the housing, characterized in that said selector shaft (30) is designed as a right prism (31) at least over an axial area on which it is movably passed within said hub (34) of said selector rocker, said hub (34) having guide surfaces (33) which extend parallel to side surfaces (32) of said prism (31) and roller bodies (35), passed into a cage (36) adapted to the cross section of said prism, are situated between the side surfaces (32) and the guide surfaces (33).

6. A gearshift device according to claim 5, characterized in that said prism (31) has the cross section of an equilateral triangle.

7. A gearshift device according to claim 6, characterized in that the triangular shape of said prism (31) can be produced by cold working, preferably tumbler working.

8. A gearshift device according to claim 1, characterized in that a plate ring (29) which has guide grooves (11) for said balls (12) is compressed into said hub (4).

9. A process for producing a selector rocker (3) according to claim 8, characterized in that in said hub (4) grooves are made by a cutting processing or a noncutting processing, preferably sintering, and in the subsequent compression of said plate ring it is shaped into the grooves in a manner such as to have guide grooves (11) on its inner periphery.

10. A process for producing a selector shaft (2) according to claim 1, characterized in that said guide grooves (10) of said selector shaft (2) are produced by cold forming in the rolling process.

* * * * *